US009026859B1

(12) United States Patent
Pike (10) Patent No.: US 9,026,859 B1
(45) Date of Patent: May 5, 2015

(54) SAFER MECHANISM FOR USING POINTERS TO CODE

(75) Inventor: Geoffrey Roeder Pike, San Francisco, CA (US)

(73) Assignee: Google Inc., Mountain View, CA (US)

( * ) Notice: Subject to any disclaimer, the term of this patent is extended or adjusted under 35 U.S.C. 154(b) by 499 days.

(21) Appl. No.: 13/419,997

(22) Filed: Mar. 14, 2012

(51) Int. Cl.
G06F 11/00 (2006.01)
G06F 11/07 (2006.01)
G06F 11/30 (2006.01)

(52) U.S. Cl.
CPC .......... G06F 11/073 (2013.01); G06F 11/3037 (2013.01)

(58) Field of Classification Search
CPC ... G06F 11/07; G06F 11/0727; G06F 11/073; G06F 11/0796; G06F 11/30; G06F 11/3037; G06F 11/36; G06F 11/3604
USPC ........... 714/6.1, 21, 25, 38.1, 38.13, 42, 47.1, 714/53
See application file for complete search history.

(56) References Cited

U.S. PATENT DOCUMENTS

| | | | | |
|---|---|---|---|---|
| 8,307,435 B1* | 11/2012 | Mann et al. | ................... | 714/38.1 |
| 8,745,741 B1* | 6/2014 | Tice et al. | ....................... | 726/22 |
| 2004/0193814 A1* | 9/2004 | Erickson et al. | .............. | 711/156 |
| 2008/0060077 A1* | 3/2008 | Cowan et al. | ................... | 726/25 |
| 2008/0140968 A1* | 6/2008 | Doshi et al. | .................... | 711/163 |
| 2008/0216175 A1* | 9/2008 | Pike | ............................... | 726/22 |
| 2009/0249289 A1* | 10/2009 | Akritidis et al. | .............. | 717/108 |

* cited by examiner

Primary Examiner — Joseph D Manoskey
(74) Attorney, Agent, or Firm — Fox Rothschild LLP (57) ABSTRACT

Systems, methods, and computer storage mediums are provided for mitigating damage to data caused by a computer process having a corrupted pointer. An exemplary method includes receiving a pointer to a memory address. The pointer is received in conjunction with a command of the computer process to access data stored at the memory address, where the data is intended to be stored in a memory segment that allows for read-only access. The memory segment that includes the memory address is analyzed to determine a modification state for the memory segment, where the modification state indicates the type of access that the memory segment allows. The computer process is halted when the modification state indicates that the memory segment allows for other than read-only access.

19 Claims, 6 Drawing Sheets

SAFER MECHANISM FOR USING POINTERS TO CODE

TECHNICAL FIELD

Embodiments disclosed herein generally relate to preventing data corruption in a computer system.

BACKGROUND

Many techniques currently exist for determining whether a computer program executing on a computing device is operating in an unexpected manner. Computer programs may behave unexpectedly due to bugs in the program, corruption of the memory being used to execute the program, or malicious modification of the computer program. The existing techniques attempt to thwart these issues by protecting either the memory stack or the memory heap, or by providing wrappers around potentially problematic library functions.

One class of techniques that are included as extensions to the GNU Compiler Collection, available from Free Software Foundation, Inc. of Boston Mass., include StackGuard, by Aaron Grier (first included in GCC 2.7.2.2), and ProPolice, by Hiroaki Etoh and Kunikazu Yoda (first implemented as a patch to GCC 3.x). These extensions protect the memory stack buffer. These methods include a "canary" value when loading a function call on the stack, and verify that the "canary" value is not corrupted when the function call is unloaded from the stack. These methods, however, tend to be inefficient and can only thwart attacks that overflow stack buffers.

A second class of techniques that protect the memory heap include the ContraPolice extension for the GNU C Library, by Andreas Krennmair. The GNU C Library ("libc") is available from Free Software Foundation, Inc. of Boston, Mass. These techniques place random "decoys" before and after heap-allocated buffers and occasionally check the decoys' validity. If one of the checks fails, the program's normal operation can be halted. These techniques, however, also tend to be inefficient and can only thwart attacks that overflow heap buffers.

A third class of techniques, including Libsafe, available from Avaya, Inc. of Basking Ridge, N.J., and the HEALERS approach, by Zhen Xiao, replace functions available in a library such as, for example, libc, with wrapper functions. Some functions in libc, such as, for example, strcpy( ), are known to be unsafe if they are misused. These techniques replace the library functions. These replacement functions, however, will not mitigate issues related to the functions that are not replaced.

A fourth class of techniques that prevent the insertion of executable code includes the W^X methods in OpenBSD, by Theo de Raadt. OpenBSD is an operating system available from The OpenBSD Foundation of Alberta, Canada. These techniques require the operating system to communicate with hardware to determine which memory pages are writable and which are executable, and disallow any page from being simultaneously writable and executable.

A fifth class of techniques makes it more difficult for an attacker to know where code and data will be located in memory. These techniques include, for example, address-space randomization, available in the PaX extension for Linux operating systems at http://pax.grsecurity.net.

A sixth class of techniques, available from Microsoft Corporation of Redmond, Wash., encrypts pointers to decrease the likelihood of a computer program misbehaving due to pointer corruption.

SUMMARY

Despite the challenges to attackers posed by the techniques described above, including address-space randomization and W^X, it is still possible for an attacker to use existing code in a sequence unintended by its creators, thereby achieving unanticipated results such as, for example, data theft. Embodiments described herein mitigate accidental or malicious corruption of a pointer to data that can cause a computer program to misbehave and lead to unanticipated results. For example, a buffer overflow or use-after-free bug may cause an object's vtable pointer to be overwritten. Later, when the corrupt vtable pointer is used, the computer processor may read a pointer-to-code from an unintended location.

The embodiments described below include systems, methods, and computer storage mediums for mitigating damage to data caused by a computer process having a corrupted pointer. An exemplary method includes receiving a pointer to a memory address. The pointer is received in conjunction with a command of the computer process to access data stored at the memory address, where the data is intended to be stored in a memory segment that allows for read-only access. The memory segment that includes the memory address is analyzed to determine a modification state for the memory segment, where the modification state indicates the type of access that the memory segment allows. The computer process is halted when the modification state indicates that the memory segment allows for other than read-only access.

Further features and advantages of the embodiments described herein, as well as the structure and operation of various embodiments, are described in detail below with reference to the accompanying drawings.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

In the following detailed description, references to "one embodiment," "an embodiment," "an example embodiment,"

etc., indicate that the embodiment described may include a particular feature, structure, or characteristic. Every embodiment, however, may not necessarily include the particular feature, structure, or characteristic. Thus, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The following detailed description refers to the accompanying drawings that illustrate exemplary embodiments. Other embodiments are possible, and modifications can be made to the embodiments within the spirit and scope of this description. Those skilled in the art with access to the teachings provided herein will recognize additional modifications, applications, and embodiments within the scope thereof and additional fields in which embodiments would be of significant utility. Therefore, the detailed description is not meant to limit the embodiments described below.

This Detailed Description is divided into sections. The first section describes example system with a computer processor configured to carry out an embodiment. The second section describes method embodiments that may be implemented in either a computer processor, a compiler, or an operating system. The third section describes an example computer system that may be used to implement the some of the embodiments described herein.

Example System Embodiments

Figure 1:
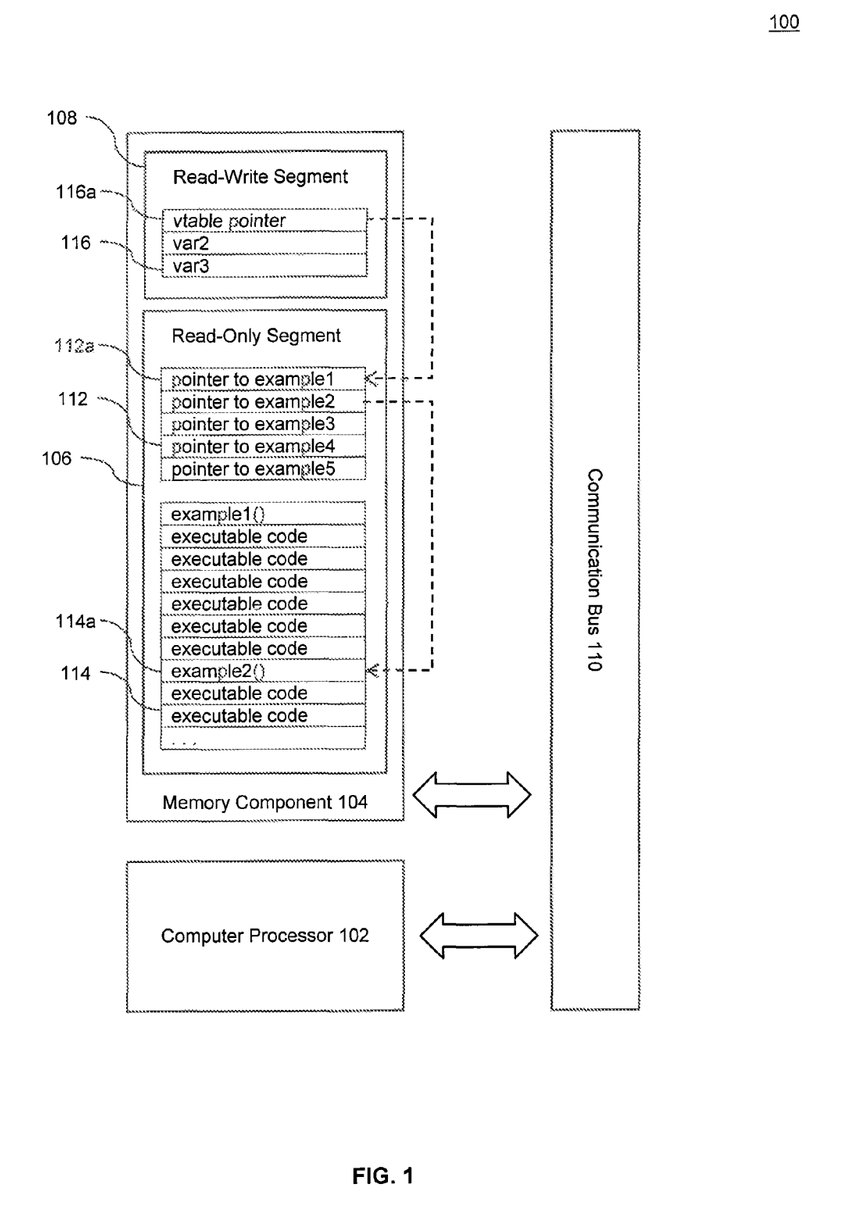
FIG. 1 is an example computer system environment for which the embodiments described herein are implemented in a computer processor.

FIG. 1 is an example computer system environment for which the embodiments described herein are implemented in a computer processor. Computer processor 102 is configured to mitigate damage to data caused by a computer process having a corrupted pointer. This embodiment is described below with reference to system 100.

System 100 includes computer processor 102 and memory component 104. Memory component 104 includes multiple memory segments including, for example, read-only segment 106 and read-write segment 108. Read-only segment 106 stores, among other things, virtual function table 112, and functions 114. Read-write segment 108 stores, among other things, variables 116. Computer processor 102 is connected to memory component 104 via communication bus 110.

Computer processor 102 can be included in any computer system including, for example, stationary computing devices (e.g., desktop computers) and mobile computing devices such as, for example, tablets, smartphones, or other network enabled portable digital devices. Computer processor 102 may execute instructions on a distribution of computer devices or a single computer device. Examples of computing devices include, but are not limited to, a central processing unit, an application-specific integrated circuit, a computer, workstation, distributed computing system, computer cluster, embedded system, stand-alone electronic device, networked device, mobile device (e.g., mobile phone, smart phone, personal digital assistant (PDA), navigation device, tablet or mobile computing device), rack server, set-top box, or other type of computer system having at least one processor and memory.

Computer processor 102 is configured to receive a pointer to a memory address. The pointer is received in conjunction with a command of the computer process to access data stored at the memory address. The data is intended to be stored at a memory address in a memory segment that allows for read-only access. The data may include, for example, a pointer to another memory address, an index into a data structure (e.g., a stack, a queue, etc.), a filename, or other data intended to be protected in read-only memory. The command may include any computer executable instruction that directs computer processor 102 to access the memory address. Executable instructions may include, for example, a jump instruction that causes computer processor 102 to jump from a first memory address to the memory address referenced by the pointer. Jump instructions may be processed as, for example, part of a function call or part of a return from a function.

In some embodiments, the pointer received by computer processor 102 may include, for example, vtable pointer 116a included in variables 116. Variables 116 may include, for example, an object in an object-oriented program. Vtable pointer 116a references pointer 112a included in virtual function table 112. Pointer 112a references the memory address of "example 1( )" function 114a included in functions 114. In this embodiment, virtual function table 112 is stored in read-only segment 106 while vtable pointer 112a is stored in read-write segment 108. In some embodiments, however, vtable pointer 112a may refer to a memory address located in read-write segment 108.

Computer processor 102 is also configured to analyze the memory segment that includes the memory address to determine a modification state for the memory segment. The modification state indicates the type of access that the memory segment allows. In some embodiments, each memory segment included in memory component 104 includes a modification state that determines the type of access allowed by computer processor 102. For example, read-only segment 106 includes a modification state that only allows computer processor 102 to read the data in the memory segment. Read-write segment 108, however, includes a memory state that allows computer processor 102 to both read data from, and write data to the memory segment. Other modification states may also be supported by memory component 104 such as, for example, write only, execute, or other states as understood by a person of skill in the art.

In some embodiments, the modification state may be set by, for example, computer processor 102 or another hardware component. In some embodiments, the modification state may be set based on instructions executed by computer processor 102. In some embodiments, the modification state is set by the operating system that controls computer processor 102. For example, the modification state may be set when the operating system loads data into either memory component 104 or a memory segment included in memory component 104. Data may be loaded, for example, when computer processor 102 executes an instruction to load an object into memory component 104. In this case, the variables of the object may be loaded into a writable memory segment such as, for example, read-write segment 108, after which the segment's modification state is set to read-write access. The object's virtual function table may be loaded into another memory segment such as, for example, read-only segment 106, after which the segment's modification state is set to read-only access.

Computer processor 102 may use any number of methods to analyze the memory segment that includes the memory address to determine the modification state. In some embodiments, the modification state may be determined by using instructions executable by computer processor 102. For example, computer processor 102 may include an executable instruction to check whether the memory segment has a read-only modification state. In some embodiments, the modification state may be determined by requesting the memory segment's access permissions. In some embodiments, the modification state may be determined by attempting to read from or write to a memory address included in the memory segment. Other methods known to those of skill in the art may also be utilized.

Computer processor 102 is further configured to halt the computer process when the modification state indicates that the memory segment allows for other than read-only access. This prevents the computer process from accessing data from an unintended memory address. Computer processor 102 may attempt to access data from an unintended memory address due to, for example, accidental or malicious activities. For example, a memory address may be corrupted due to a bug in a computer process overwriting the data stored at the memory address. Alternatively, a memory address may be corrupted due to malicious activity such as, for example, an attacker intentionally overwriting a memory address to cause the computer process to execute instructions that could compromise data stored on the computer system.

In some embodiments, computer processor 102 automatically checks the modification state of the memory segment referenced by vtable pointer 116a when computer processor 102 processes an instruction to jump to the memory address referenced by vtable pointer 116a. For example, if computer processor 102 determines that vtable pointer 116a references a memory address located in a memory segment that allows writable access, computer processor 102 halts the computer process. In some embodiments, halting the computer process includes terminating the computer process. In other embodiments, halting the computer process includes pausing the computer process while awaiting instructions from the operating system or a user.

In some embodiments, instead of checking the modification state automatically, computer processor 102 executes verification instructions—inserted, for example, before a jump instruction—to check the modification state. The verification instructions can be inserted by, for example, a compiler when the computer process is compiled into executable code, or the operating system that is executing the computer process. In some embodiments, the verification instructions can also include halt instructions that either terminate or pause the computer process.

In some embodiments, computer processor 102 is further configured to generate a fault code indicating that the computer process is halted due to the memory address being located in a memory segment that has a modification state that allows for other than read-only access. For embodiments that terminate the computer process, the fault code can be used to indicate that the process was terminated. For embodiments that pause the computer process, the fault code can be returned to the operating system to indicate that the process is paused.

In some embodiments, an entire object is loaded into a read-only memory segment such as, for example, read-only segment 114. Because the object may include variables that require writable access, the modification state for the segment can be set to allow for writable access each time a variable is modified, and set back to read-only access when variable modification is complete.

Example Method Embodiments

Figure 2:
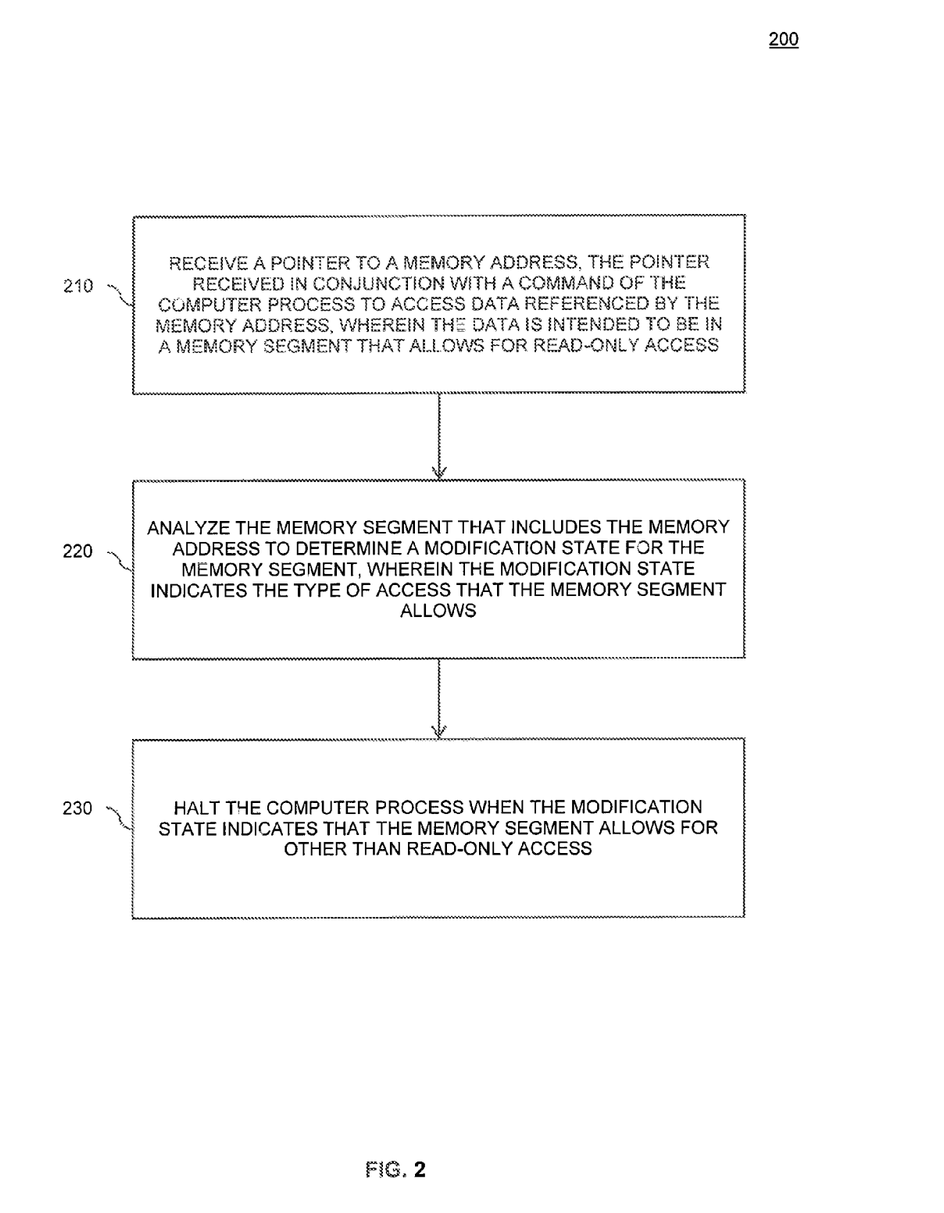
FIG. 2 is a flowchart illustrating an exemplary method for mitigating damage to data caused by a computer process having a corrupted pointer.

FIG. 2 is a flowchart illustrating an exemplary method 200 for mitigating damage to data caused by a computer process having a corrupted pointer. While method 200 is described with respect to an embodiment, method 200 is not meant to be limiting and may be used in other applications. Additionally, method 200 may be carried out by, for example, system 100.

As depicted in exemplary method 200 set forth in FIG. 2, a pointer to a memory address is received (stage 210). The pointer is received in conjunction with a command of the computer process to access data stored at the memory address. The data is intended to be stored in a memory segment that allows for read-only access. The pointer is received in conjunction with an instruction processed by a computer processor such as, for example, a jump instruction. Stage 210 may be carried out by, for example, computer processor 102 embodied in system 100.

Next, the memory segment that includes the memory address to determine a modification state for the memory segment is analyzed (stage 220). The modification state indicates the type of access that the memory segment allows. Modification states may include, for example, a read-only state, a write state, an execute state, or a combination of states. Stage 220 may be carried out by, for example, computer processor 102 embodied in system 100.

The computer process is halted when the modification state indicates that the memory segment allows for other than read-only access (stage 230). Halting the computer process may include, for example, pausing or terminating the computer process. If the process is paused, information may be provided to the system running the process indicating that the process is awaiting further instructions. If the process is terminated, information may be provided to the system running the process indicating that the process terminated. Stage 230 may be carried out by, for example, computer processor 102 embodied in system 100.

Figure 3:
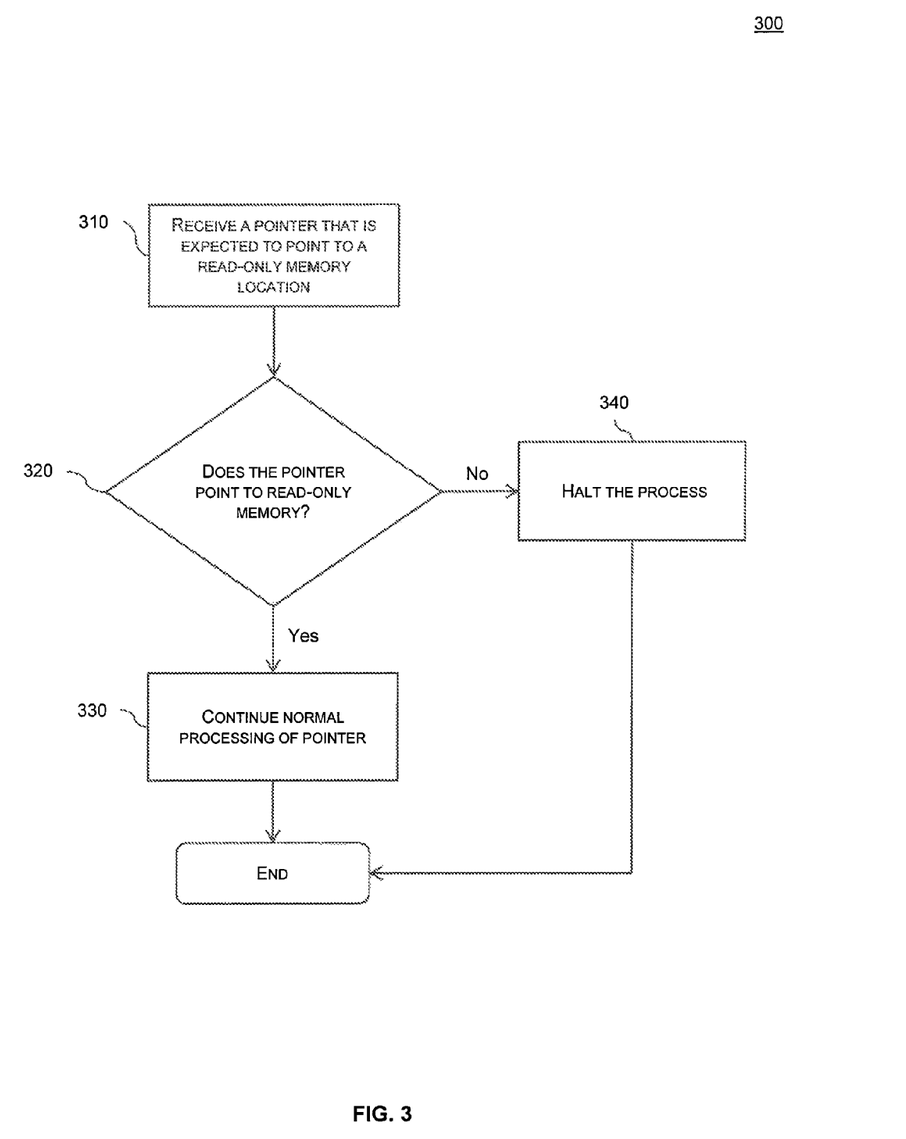
FIG. 3 is a flowchart illustrating an exemplary method that mitigates damage to data caused by a computer process having a corrupted pointer, where the method is implemented in a computer processor.

FIG. 3 is a flowchart illustrating an exemplary method 300 that mitigates damage to data caused by a computer process having a corrupted pointer. This method may be implemented in a computer processor such as, for example, computer processor 102 in FIG. 1. While method 300 is described with respect to an embodiment, method 300 is not meant to be limiting and may be used in other applications. Additionally, method 300 may be carried out by, for example, system 100.

As depicted in exemplary method 300 set forth in FIG. 3, a pointer is received that is expected to point to a memory address located in read-only memory segment. The pointer may point to data such as, for example, a virtual function table (vtable) or other data that is expected to not be modified (stage 310). In some embodiments, the virtual function table may include one or more pointers to virtual functions. In some embodiments, other data that is intended to not be modified may include, for example, operation stacks, text strings, or other constant data. Stage 310 may be carried out by, for example, computer processor 102 embodied in system 100.

Next, whether the pointer points to a memory address located in a read-only memory segment is determined (stage 320). The memory segment may be included among other memory segments in a memory component. Each memory segment may be of fixed size or variable size and may allow for read access, write access, execute access, or a combination of the foregoing. Stage 320 may be carried out by, for example, computer processor 102 embodied in system 100.

If the pointer points to a memory address located in a read-only memory segment, normal processing of the pointer is continued (stage 330). Stage 330 may be carried out by, for example, computer processor 102 embodied in system 100.

If the pointer points to a memory address located in other than a read-only memory segment, the computer process is halted (stage 340). Because the pointer is expected to point to read-only data, a computer process using a pointer to access data located in a memory segment providing for other than read-only access may indicate that the computer process has either malfunctioned or has been maliciously modified. Stage 340 may be carried out by, for example, computer processor 102 embodied in system 100.

Figure 4:
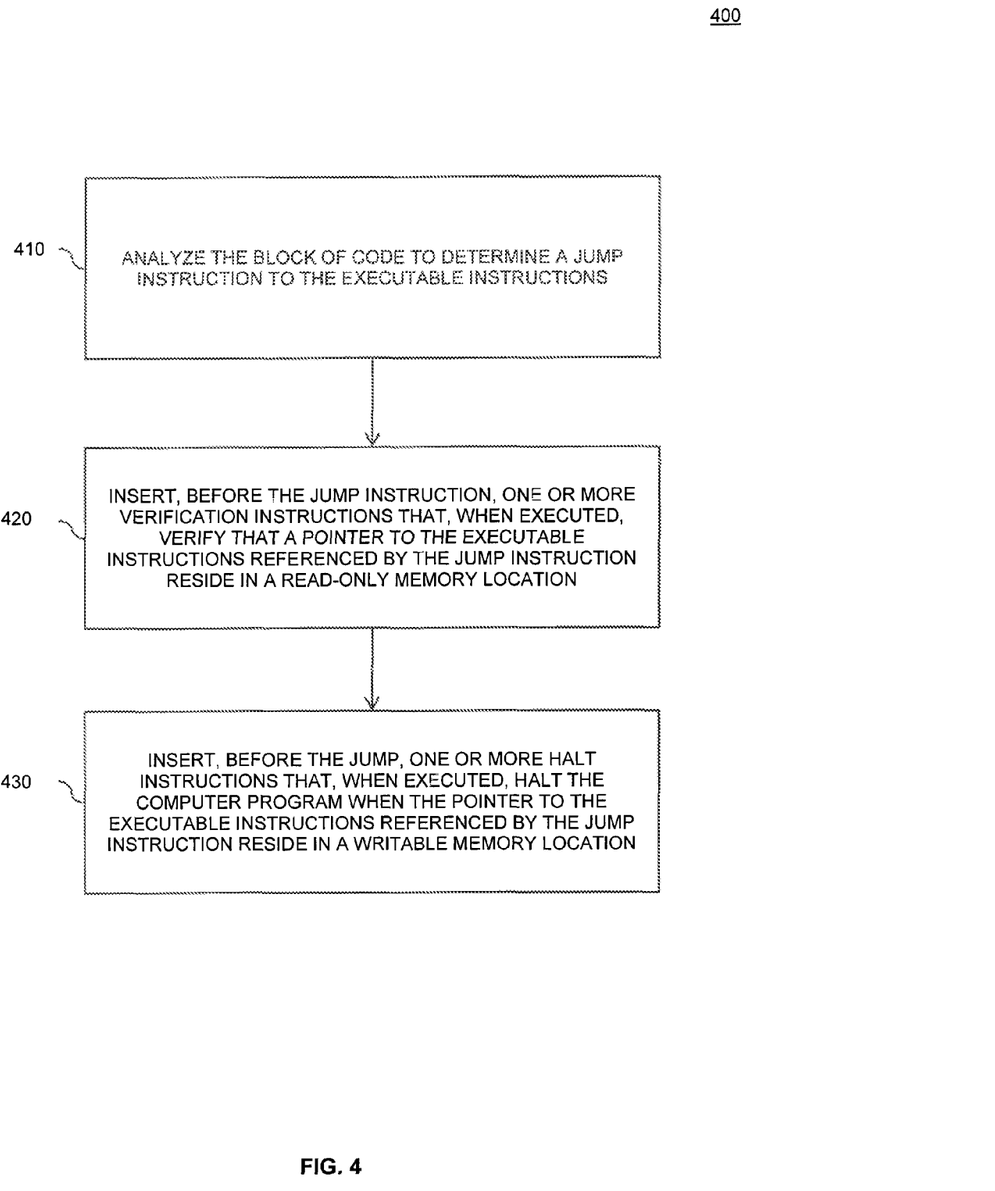
FIG. 4 is a flowchart illustrating an exemplary method for compiling a computer programming language in order to mitigate damage to data caused by a resulting computer program that, when executed, accesses a corrupted pointer.

FIG. 4 is a flowchart illustrating an exemplary method 400 for compiling a computer programming language in order to mitigate damage to data caused by a resulting computer program that, when executed, has a corrupted pointer. While method 400 is described with respect to an embodiment, method 400 is not meant to be limiting and may be used in other applications. Additionally, method 400 may be executed by, for example, computer system 600.

As depicted in exemplary method 400 set forth in FIG. 4, the block of code is analyzed to determine a jump instruction to the executable instructions (stage 410). The block of code can be written in any of several computer programming languages such as, for example, C, C++, C#, Java, or any other programming language that allows executing code to jump from one block of instructions to another. The jump instruction can include, for example, an assembly code level jump instruction or a function call. The function call can reference a function in an external library or a function in an object class. The function call may also reference an entry point into a block of executable code. Stage 410 may be carried out by, for example, computer system 600.

Next, before the jump instruction, one or more verification instructions are inserted that, when executed, verify that a pointer to the executable instructions referenced by the jump instruction reside in a read-only memory location (stage 420). The verification instructions can utilize computer processor specific instructions to check the state of memory that can be accessed by the computer processor. Additionally, the verification instructions may be updated at execution time by an operating system the is used to execute the computer process. In some embodiments, the verification instructions and the jump instruction are combined into a single instruction supported by the computer processor. Stage 420 may be carried out by, for example, computer system 600.

Therefore, before the jump, one or more halt instructions are inserted that, when executed, halt the computer process when the pointer to the executable instructions referenced by the jump instruction resides in a writable memory location (stage 430). The halt instructions can either pause or terminate the computer program and can include instructions to notify the system executing the computer process that the process has been halted. Stage 430 may be carried out by, for example, computer system 600.

Example Implementation

Figure 5A:
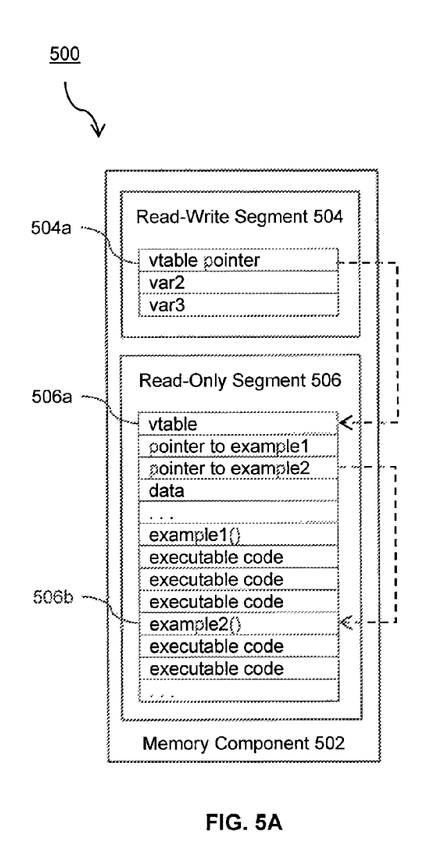
FIG. 5A illustrates an example memory that may be used by the computer system environment in FIG. 1.

FIG. 5A illustrates an example memory 500 that may be used by the computer system environment in FIG. 1. Memory 500 includes memory component 502. Memory component 502 may be implemented by one or more memory hardware units that are coupled to a computer processor. Memory component 502 may include one or more memory segments such as, for example, read-write segment 504 and read-only segment 506. Read-write segment 504 may include one or more object, variables, pointers, or other data that can be modified by the computer processor. Here, read-write segment includes vtable pointer 504a that is expected to indicate the memory address of an object's vtable. Read-only memory segment 506 may include data that is not to be modified by the computer process such as, for example, a virtual function table (vtable) that is included in an object. Here, read-only memory 506 includes vtable 506a that includes virtual function 506b.

Figure 5B:
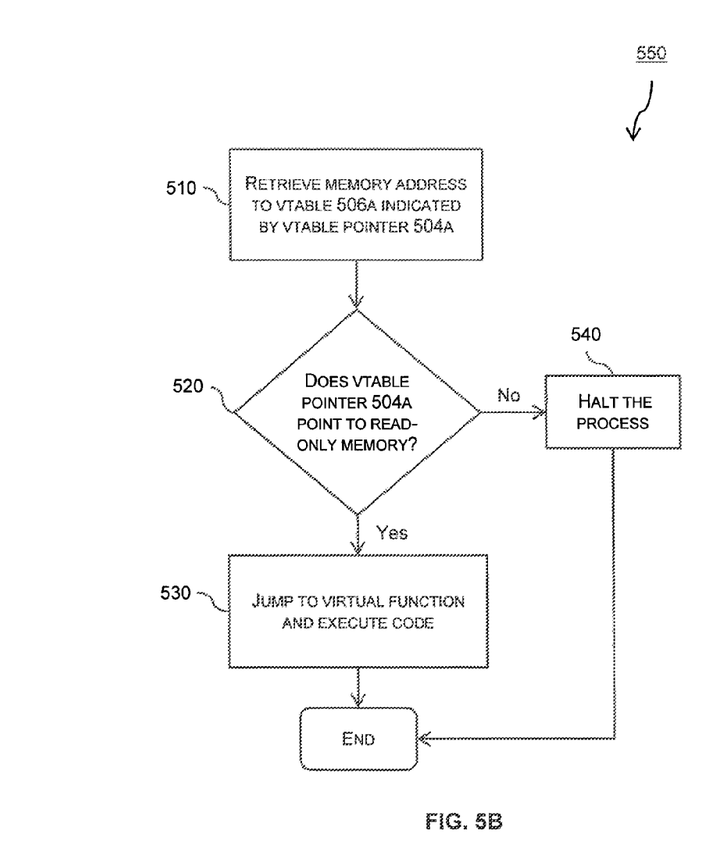
FIG. 5B is a flowchart illustrating an exemplary method that mitigates damage to data caused by a computer process having a corrupted pointer, where the method is implemented in using the memory in FIG. 5A.

FIG. 5B is a flowchart illustrating an exemplary method 550 that mitigates damage to data caused by a computer process having a corrupted pointer, where the method is implemented in using memory 500 in FIG. 5A. This method may be implemented in a computer processor such as, for example, computer processor 102 in FIG. 1. While method 550 is described with respect to an embodiment, method 550 is not meant to be limiting and may be used in other applications. Additionally, method 550 may be carried out by, for example, system 100.

As depicted in exemplary method 550 set forth in FIG. 5B, a memory address to vtable 506a is first retrieved (stage 510). The memory address of vtable 506a may be retrieve from, for example, vtable pointer 504a that is included in an object stored in read-write segment 504. In some embodiments, vtable pointer 504a may include a data value indicating a relative position within vtable 506a. In some embodiments, vtable pointer 504a may include an absolute value indicating a memory address located within vtable 506a. Stage 510 may be carried out by, for example, computer processor 102 embodied in system 100.

Thereafter, a determination is made as to whether the memory address indicated by vtable 504a is located in a read-only memory segment such as, for example, read-only segment 506 (stage 520). Under normal operation, it will be expected that vtable pointer 504a points the memory address of vtable 506a. Whether the memory address indicated by vtable pointer 504a is located in a read-only memory segment may be determined using instructions executed by a computer processor. Stage 520 may be carried out by, for example, computer processor 102 embodied in system 100.

If the memory address indicated by vtable pointer 504a is located in a read-only memory segment, a jump is made to a virtual function included in vtable 506a and executes the code included in the virtual function (stage 530). The virtual function may be indicated by either vtable pointer 504a or data included with vtable pointer 504a. Stage 530 may be carried out by, for example, computer processor 102 embodied in system 100.

If the memory address indicated by vtable pointer 504a is not included in a read-only memory segment, the computer process is halted (stage 540). Stage 540 may be carried out by, for example, computer processor 102 embodied in system 100.

The implementations described by FIGS. 5A and 5B are merely included as examples are not intended to limit the embodiments described herein.

Example Computer System

Figure 6:
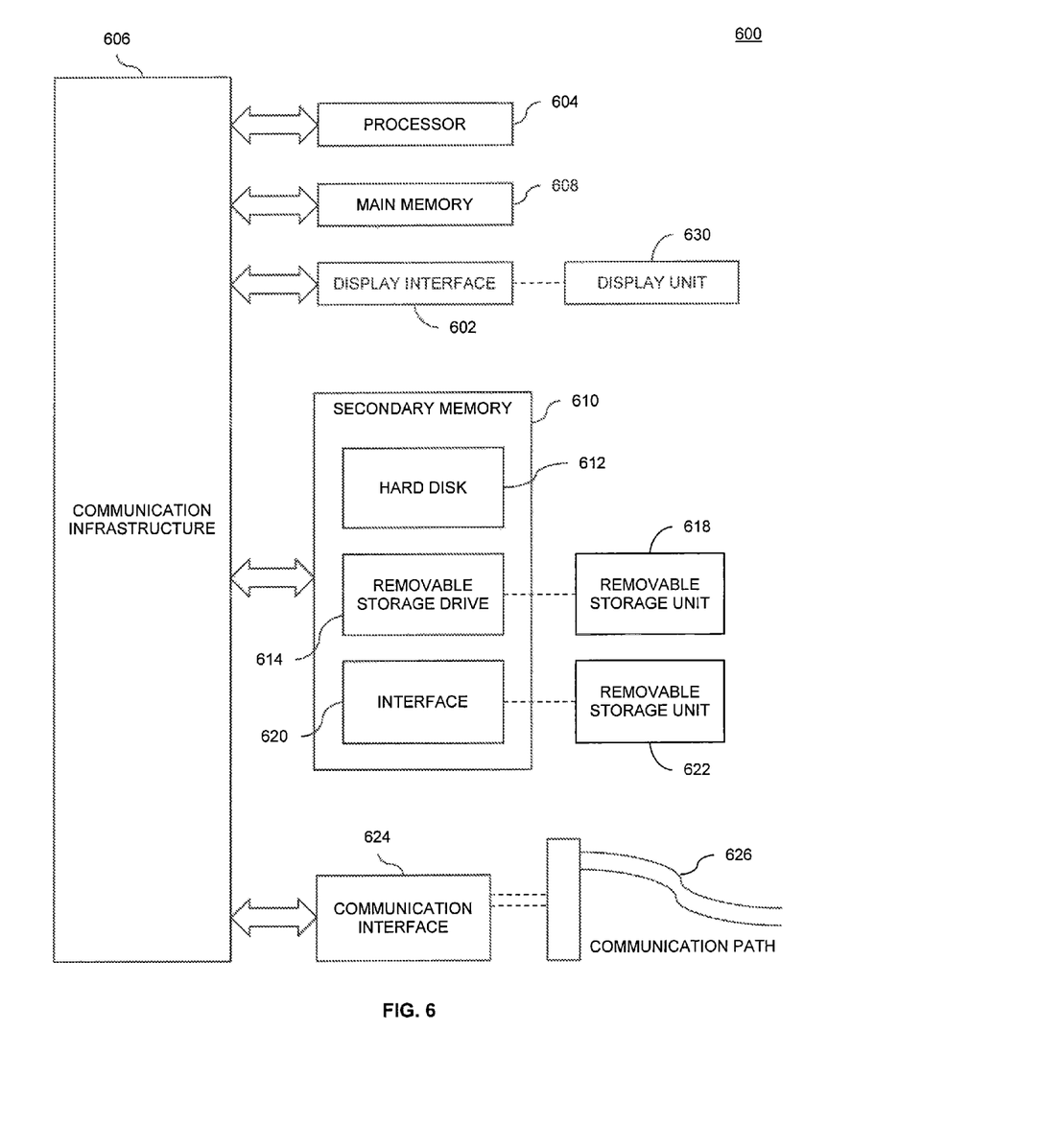
FIG. 6 illustrates an example computer in which embodiments of the present disclosure, or portions thereof, may be implemented as computer-readable code.

FIG. 6 illustrates an example computer system 600 in which embodiments of the present disclosure, or portions thereof, may be implemented. For example, method 400 may be implemented in one or more computer systems 600 using hardware, software, firmware, computer readable storage media having instructions stored thereon, or a combination thereof.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above described embodiments. A processor device may be a single processor, a plurality of processors, or combinations thereof. Processor devices may have one or more processor "cores."

Various embodiments are described in terms of this example computer system 600. After reading this description, it will become apparent to a person skilled in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 604 may be a single processor in a multi-core/multiprocessor system, such system operating alone, or in a cluster of computing devices operating in a cluster or server farm. Processor device 604 is connected to a communication infrastructure 606, for example, a bus, message queue, network, or multi-core message-passing scheme.

Computer system 600 also includes a main memory 608, for example, random access memory (RAM), and may also include a secondary memory 610. Secondary memory 610 may include, for example, a hard disk drive 612, and removable storage drive 614. Removable storage drive 614 may include a floppy disk drive, a magnetic tape drive, an optical disk drive, a flash memory drive, or the like. The removable storage drive 614 reads from and/or writes to a removable storage unit 618 in a well-known manner. Removable storage unit 618 may include a floppy disk, magnetic tape, optical disk, flash memory drive, etc. which is read by and written to by removable storage drive 614. As will be appreciated by persons skilled in the relevant art, removable storage unit 618 includes a computer readable storage medium having stored thereon computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 may be in the form of signals, which may be electronic, electromagnetic, optical, or other signals capable of being received by communications interface 624. These signals may be provided to communications interface 624 via a communications path 626, Communications path 626 carries signals and may be implemented using wire or cable, fiber optics, a phone line, a cellular phone link, an RF link or other communications channels.

In this document, the terms "computer storage medium" and "computer readable storage medium" are used to generally refer to media such as removable storage unit 618, removable storage unit 622, and a hard disk installed in hard disk drive 612. Computer storage medium and computer readable storage medium may also refer to memories, such as main memory 608 and secondary memory 610, which may be memory semiconductors (e.g. DRAMs, etc.).

Computer programs (also called computer control logic) are stored in main memory 608 and/or secondary memory 610. Computer programs may also be received via communications interface 624. Such computer programs, when executed, enable computer system 600 to implement the embodiments described herein. In particular, the computer programs, when executed, enable processor device 604 to implement the processes of the embodiments, such as the stages in the methods illustrated by flowchart 400 of FIG. 4, discussed above. Accordingly, such computer programs represent controllers of computer system 600. Where an embodiment is implemented using software, the software may be stored in a computer storage medium and loaded into computer system 600 using removable storage drive 614, interface 620, and hard disk drive 612, or communications interface 624.

Embodiments of the invention also may be directed to computer program products including software stored on any computer readable storage medium. Such software, when executed in one or more data processing device, causes a data processing device(s) to operate as described herein. Examples of computer readable storage mediums include, but are not limited to, primary storage devices (e.g., any type of random access memory) and secondary storage devices (e.g., hard drives, floppy disks, CD ROMS, ZIP disks, tapes, magnetic storage devices, and optical storage devices, MEMS, nanotechnological storage device, etc.).

CONCLUSION

The Summary and Abstract sections may set forth one or more but not all exemplary embodiments as contemplated by the inventor(s), and thus, are not intended to limit the present invention and the appended claims in any way.

The foregoing description of specific embodiments so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

What is claimed is:

1. A computer-implemented method for mitigating damage to data caused by a computer process having a corrupted pointer, the method comprising:

receiving, by at least one computer processor, a pointer to a memory address, the pointer received in conjunction with a command by the computer process to access data stored at the memory address, wherein the data is intended to be stored in a memory segment that allows for read-only access, wherein the data comprises a function pointer to an executable code function;

analyzing, by at least one computer processor, the memory segment that includes the memory address to determine a modification state for the memory segment, wherein the modification state indicates the type of access that the memory segment allows; and halting, by at least one processor, the computer process when the modification state indicates that the memory segment allows for other than read-only access.

2. The computer-implemented method of claim 1, wherein the function pointer is included in a virtual function table.

3. The computer-implemented method of claim 1, further comprising:
generating a fault code indicating that the computer process is halted due to the memory address being in a memory segment that allows for writable access.

4. The computer-implemented method of claim 1, wherein data at the memory address includes inputs to a computation that, when provided to the computer processor, determine the location of additional data.

5. The computer-implemented method of claim 1, wherein data at the memory address includes a name of a function that includes executable instructions.

6. The computer-implemented method of claim 1, wherein data at the memory address includes a name of a file that includes executable instructions.

7. A system for mitigating damage to data caused by a computer process having a corrupted pointer, the system comprising:
a memory; and
a computer processor coupled to the memory and configured to:
receive a pointer to a memory address of the memory, the pointer received in conjunction with a command by the computer process to access data stored at the memory address, wherein the data is intended to be stored in a memory segment that allows for read-only access, wherein the data comprises a function pointer to an executable code function;
analyze the memory segment that includes the memory address to determine a modification state for the memory segment, wherein the modification state indicates the type of access that the memory segment allows; and
halt the computer process when the modification state indicates that the memory segment allows for other than read-only access.

8. The system of claim 7, wherein the function pointer is included in a virtual function table.

9. The system of claim 7, wherein the computer processor is further configured to generate a fault code indicating that the computer process is halted due to the memory address being in a memory segment that allows for writable access.

10. The system of claim 7, wherein data at the memory address includes inputs to a computation that, when provided to the computer processor, determine the location of additional data.

11. The system of claim 7, wherein data at the memory address includes a name of a function that includes executable instructions.

12. The system of claim 7, wherein data at the memory address includes a name of a file that includes executable instructions.

13. A computer readable storage medium having instructions encoded thereon that, when executed by a computing device, causes the computing device to perform operations comprising:
receiving a pointer to a memory address, the pointer received in conjunction with a command by the computer process to access data stored at the memory address, wherein the data is intended to be stored in a memory segment that allows for read-only access, wherein the data comprises a function pointer to an executable code function;
analyzing the memory segment that includes the memory address to determine a modification state for the memory segment, wherein the modification state indicates the type of access that the memory segment allows; and
halting the computer process when the modification state indicates that the memory segment allows for other than read-only access.

14. The computer readable storage medium of claim 13, wherein the function pointer is included in an object's virtual function table.

15. The computer readable storage medium of claim 13, further comprising:
generating a fault code indicating that the computer process is halted due to the memory address being in a memory segment that allows for writable access.

16. The computer readable storage medium of claim 13, wherein data at the memory address includes inputs to a computation that, when provided to the computer processor, determine the location of additional data.

17. The computer readable storage medium of claim 13, wherein the memory address includes a name of a function that includes executable instructions.

18. The computer readable storage medium of claim 13, wherein the memory address includes a name of a file that includes executable instructions.

19. A computer-implemented method for compiling a computer programming language in order to mitigate damage to data caused by a resulting computer program that, when executed, has a corrupted pointer that references executable instructions, the method comprising:
analyzing, by at least one computer processor, a block of code to determine a jump instruction to the executable instructions;
inserting, before the jump instruction, by at least one computer processor, one or more verification instructions that, when executed, verify that a pointer to the executable instructions referenced by the jump instruction reside in a read-only memory location;
inserting, before the jump, by at least one computer processor, one or more halt instructions that, when executed, halt the computer program when the pointer to the executable instructions referenced by the jump instruction reside in a writable memory location.

* * * * *